May 18, 1965 J. V. FREDD 3,183,972

PERFORATOR HANGER

Filed April 14, 1961 4 Sheets-Sheet 1

INVENTOR:
JOHN V. FREDD

BY

Mellin and Hanscom

ATTORNEYS

May 18, 1965 J. V. FREDD 3,183,972

PERFORATOR HANGER

Filed April 14, 1961 4 Sheets-Sheet 2

INVENTOR:
JOHN V. FREDD

BY Mellin and Hanscom

ATTORNEYS

May 18, 1965

J. V. FREDD 3,183,972

PERFORATOR HANGER

Filed April 14, 1961

4 Sheets-Sheet 3

INVENTOR:
JOHN V. FREDD
BY
Mellin and Hanscom
ATTORNEYS

INVENTOR:
JOHN V. FREDD
BY
Mellin and Hanscom
ATTORNEYS

United States Patent Office 3,183,972
Patented May 18, 1965

3,183,972
PERFORATOR HANGER

John V. Fredd, Dallas, Tex., assignor to Otis Engineering Corporation, Dallas, Tex., a corporation of Delaware Filed Apr. 14, 1961, Ser. No. 103,157
9 Claims. (Cl. 166—35)

This invention relates to hanger devices for oil wells and more particularly to a novel method and apparatus for hanging a gun perforator from a location within a well flow conductor.

An important object of this invention is to provide a means for and a method of perforating a well by lowering a gun perforator and hanger in the well on a wire line, suspending the perforator from a hanger locked within the well pipe, firing the perforator and then retrieving the hanger and remains of the perforator from the well all in a single trip of a wire line, and with great safety.

Another object of this invention is to provide a perforator hanger which can be lowered into a well on a conventional non-conductor wire line and used to suspend and operate an electrically fired gun perforator.

Another object of this invention is to provide a means of suspending a gun perforator from a known reference point which may be near the desired perforating depth and remote from the surface, thus keeping to a minimum the distance which must be measured critically.

Still another object of the invention is to provide a means for lowering a gun perforator in wells having extremely high surface pressure.

An important object of this invention is to provide a means permitting the firing of a gun perforator in a well while the wire line and hanger tool by which it is lowered thereinto is anchored therein and is in tension.

A still further object of this invention is to provide a perforator hanger which maintains the firing mechanism unarmed both during the lowering and withdrawing operations, thus permitting safe installation and removal of the perforator. This is especially important in case of a misfire.

A further object of the invention is to provide means whereby the perforator hanger and a battery are lowered into a well together but are electrically unconnected and wherein the electrical connection between the hanger and battery is first made after the hanger is locked in place at the desired depth.

Yet another object of the invention is to provide apparatus in which well perforation can be performed on a single trip of a wire line but in which the wire line can be detached and removed from the performator hanger after the hanger is locked in place in the well tubing, if so desired, without causing detonation.

A yet further object of this invention is to provide a more economical means for perforating a well, rendering elaborate and costly surface units usually associated with such operations unnecessary.

In general, the present invention has been developed to provide a method and apparatus for safely carrying out well perforating operations using a single non-conducting wire line for manipulation of the gun perforator and using only one trip of the wire line and attached tools into and out of the well.

Prior wire line perforating methods, of suitable safety, have required multiple runs of the wire line to set the perforator, fire it and then remove it. For example, a typical wire line operation now in use for well perforation is that illustrated in the United States Patent No. 2,896,721 issued to W. R. Cannaday. In the method disclosed in this patent, three complete wire line trips are required. The perforator is first run in and suspended at the desired depth. The running tool is removed from the well and a battery is then run in and connected to the perforator. After detonation, the battery is removed and a retrieving tool is run in to pull the perforator from the well. Each complete wire line trip requires considerable time and labor, especially in deep wells. The present invention reduces this trip expense to the minimum since only one complete trip is made.

Safety is not sacrificed in the one-trip method of the present invention, since various safety features are provided to prevent accidental firing of the perforator at any point other than the desired depth. The electrical circuit from the battery to the perforator cannot be completed until after the perforator hanger is properly locked into place at the proper point. Upon firing the perforator a fuse blows to disconnect the battery from the perforator and the circuit to the perforator is additionally grounded so that even if there is a misfire the apparatus may be safely pulled from the well without fear of detonation during the trip up.

There are times in which it is desirable not to fire the perforator after it is locked in place. As an additional safety feature, the present invention also allows the perforator to be removed from the well without firing.

Other objects and advantages of the present invention will become apparent in the course of the following detailed description.

In the drawings, forming a part of this application, and in which like parts are designated by like reference numerals throughout the same:

Figures 1A, 1B, 1C, 5, 6, 7, 8, 9:
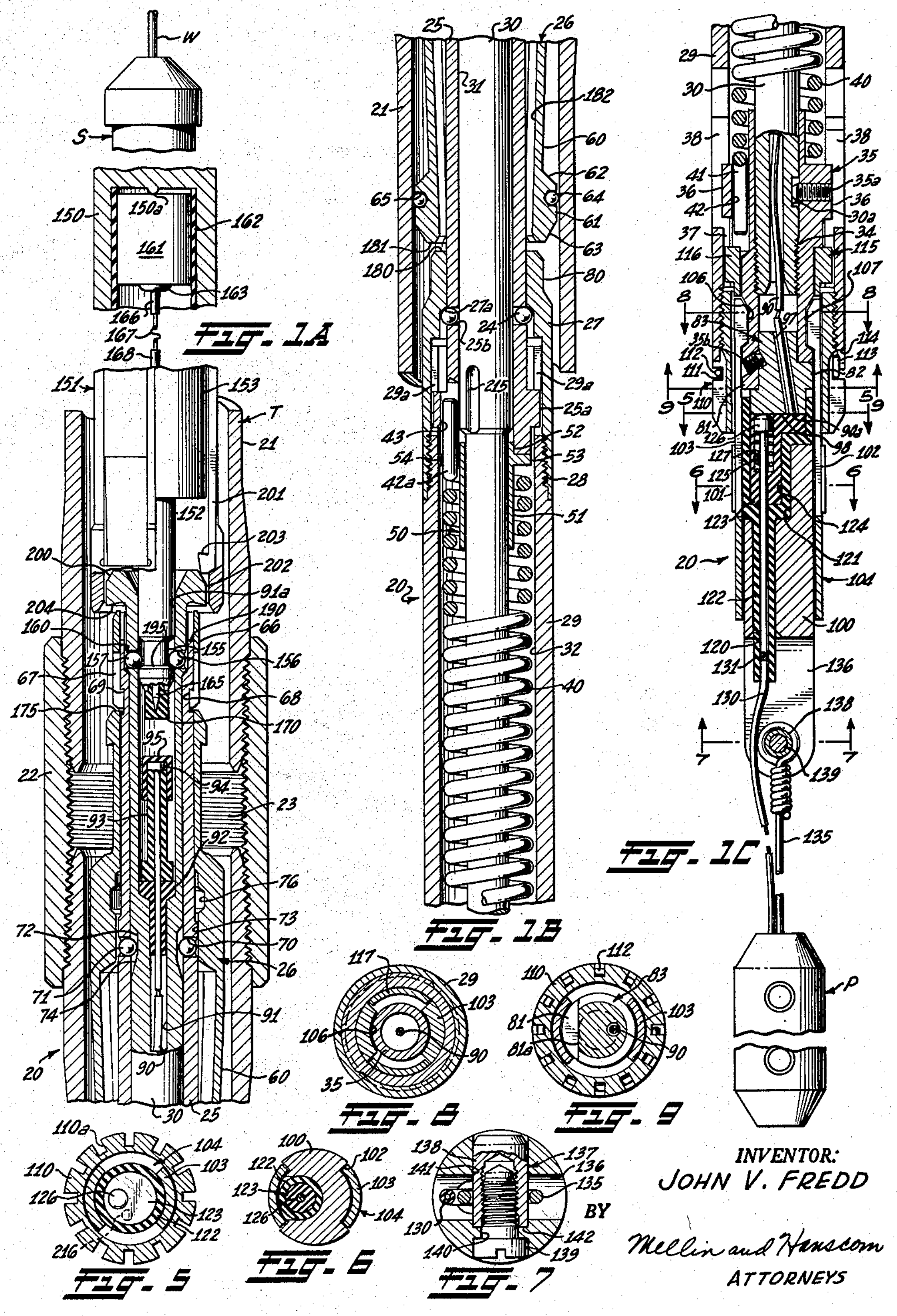
FIGS. 1A, 1B and 1C are successive elevational views, partly in section and partly in elevation wtih some parts broken away, showing an embodiment of this invention, being lowered through the tubing of a well on a conventional wire line.
FIG. 5 is a cross-sectional view taken along line 5—5 of FIG. 1C.
FIG. 6 is a cross-sectional view taken along line 6—6 of FIG. 1C.
FIG. 7 is a cross-sectional view taken along line 7—7 of FIG. 1C.
FIG. 8 is a cross-sectional view taken along line 8—8 of FIG. 1C.
FIG. 9 is a cross-sectional view taken along line 9—9 of FIG. 1C.

Referring now to the drawings, and specifically to FIGS. 1A, 1B and 1C, perforator hanger 20 is adapted to be positioned in a well flow conductor such as the tubing string T which is composed of sections 21 joined together by couplings 22 so that a coupling recess 23 is formed between the ends of adjacent sections. Tubing string T may be disposed within a well casing as in a conventional well, or it may be disposed in the well bore in lieu of casing in what has been termined a "tubingless completion." In any case, the distance or depth relationship between couplings 22 and the various subsurface formations will be known from a collar log as will the depth relationship between couplings 22 and the surface or wellhead.

The perforator hanger includes a tubular mandrel 25 about which a collet 26 is mounted for limited longitudinal movement. Lock member 27 is slidably mounted about the lower portion of the mandrel 25 and is provided with thread 28 by which tubular body 29 is attached thereto.

Figure 16:
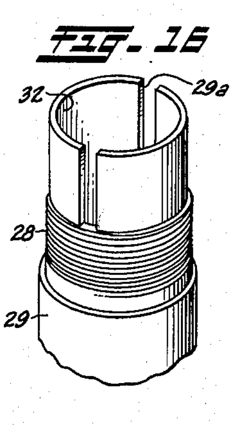
FIG. 16 is a perspective view of the upper end of tubular body 29 showing the pair of slots formed therein.

The lower end of mandrel 25 is provided with outwardly projecting lugs **25*a* which engage slots 29*a* formed in the upper end of body 29, above thread 28, to prevent relative rotational movement between the mandrel and the body but permitting relative longitudinal movement therebetween. Slots 29*a*** may be more readily seen by referring to FIG. 16.

Tubular core 30 is disposed within the mandrel 25 and body 29, occupying bores 31 and 32 thereof, respectively, as shown.

Attached to the lower end of core 30, as by thread 34, is control member 35 which is provided with outwardly extending lugs 36 which enter the body by keyways 37 and operate in control slot 38. Slot 38 limits the longitudinal movement of core 30 relative to body 29 and mandrel 25 as will be explained later. Screw **35*a* engages flat surface 30*a* of core 30 to properly align these parts and therefore orient lugs 36 with mandrel 25, body 29**, and the switch mechanism to be described later.

Spring 40 is disposed about core 30 within body 29. The lower end of the spring is bent straight downwardly at 41 and is engaged in aperture 42 formed in control member 35 as shown. In a similar manner, the upper end of spring 40 is bent straight upwardly at **42*a* and is engaged in aperture 43 formed in the lower end of mandrel 25**.

Spring 40 is both in compression and torsion, biasing control member 35 downwardly relative to housing 29, and at the same time applying a torsional force to control member 35 tending to rotate it in a clockwise direction relative to housing 29 when viewed upwardly from below.

Thus as core 30 is reciprocated within the mandrel and body, its lugs 36 are caused to follow control slot 38 to control the sequence operation of the device, as will be explained later. It should be understood that control member 35, being biased downwardly by spring 40, acts through lugs 36 and operating slot 38 to apply a force to body 29 tending to move it downwardly relative to mandrel 25, but such relative movement is prevented at this time by balls 24 which, being disposed in lateral apertures **25*b* and being supported in their outer position by tubular core 30, constitute an upwardly facing obstruction which is engageable by downwardly facing internal annular shoulder 27*a* to limit downward movement of lock member 27 upon mandrel 25** as shown.

Spring guide 50 is disposed about core member 30 with its lower portion 51 projecting downwardly inside spring 40 to serve as a guide therefor. Its upper portion 52 extends upwardly in bore 31 of mandrel 25 to held hold it centered relative to the mandrel and core. Its external annular flange 53 is disposed between the lower end of the mandrel and the uppermost coil of spring 40 and is provided with a slot 54 through which the end of the spring extends to engage aperture 43. One of the primary functions of the spring guide is to reduce friction between the core and the spring and to thus improve the operation of the device.

Collet 26 which is slidably mounted about mandrel 25 is provided with fingers 60 having outwardly projecting bosses 61 adapted to engage in annular recesses in the tubing wall such as coupling recess 23. Collet fingers 60 inherently spring outwardly to engage such recesses but, as the collet is moved through the tubing bore, the inclined surfaces 62 and 63 at the upper and lower ends, respectively, of bosses 61 cause the fingers to be cammed inwardly to disengage the recesses unless they are locked against such disengagement as will be explained later. Because of the inherent tendency of the collet fingers to move outwardly to their relaxed position, they guide along the inner wall of the tubing and would wear away rapidly were it not for the fact that each boss is provided with a hardened ball 64 which is secured in recess 65 as by silver soldering.

Mandrel 25 is provided at its upper end with a retainer 66 having downwardly extending fingers 67 whose inwardly projecting hooks 68 engage external annular groove 69 formed in the mandrel. Retainer 66 limits the upward travel of collet 26 upon the mandrel 25.

Mandrel 25 is further provided with lateral apertures 70 in which balls 71 are disposed. The diameter of the balls is considerably greater than the thickness of the mandrel wall. The balls, as shown in FIG. 1A, engage the external annular groove 72 formed in the core and are confined or held against disengagement therefrom by the close fit of bore 73 of the collet. An upward pull applied to core 30 causes inclined surface 74, which forms the lower wall of groove 72, to apply an outwardly acting force on balls 71. Under these conditions, when collet 26 is moved to its lowermost position and the internal annular groove 76 formed therein becomes aligned with apertures 70 of the mandrel, balls 71 will move outwardly to engage groove 76 and at the same time disengage from groove 72 as core 30 moves upwardly. This locks the collet on the mandrel as is clearly shown in FIG. 2A.

When collet 26 moves to its lowermost position on mandrel 25, the lower ends of its fingers are disposed about the periphery of upper reduced portion 80 of lock member 27 so that they can no longer be moved inwardly. This can only happen when the collet fingers are in their outermost or relaxed position as when they engage an annular recess such as coupling recess 23 as shown in FIG. 2A.

Figures 2A, 2B, 10, 11, 14:
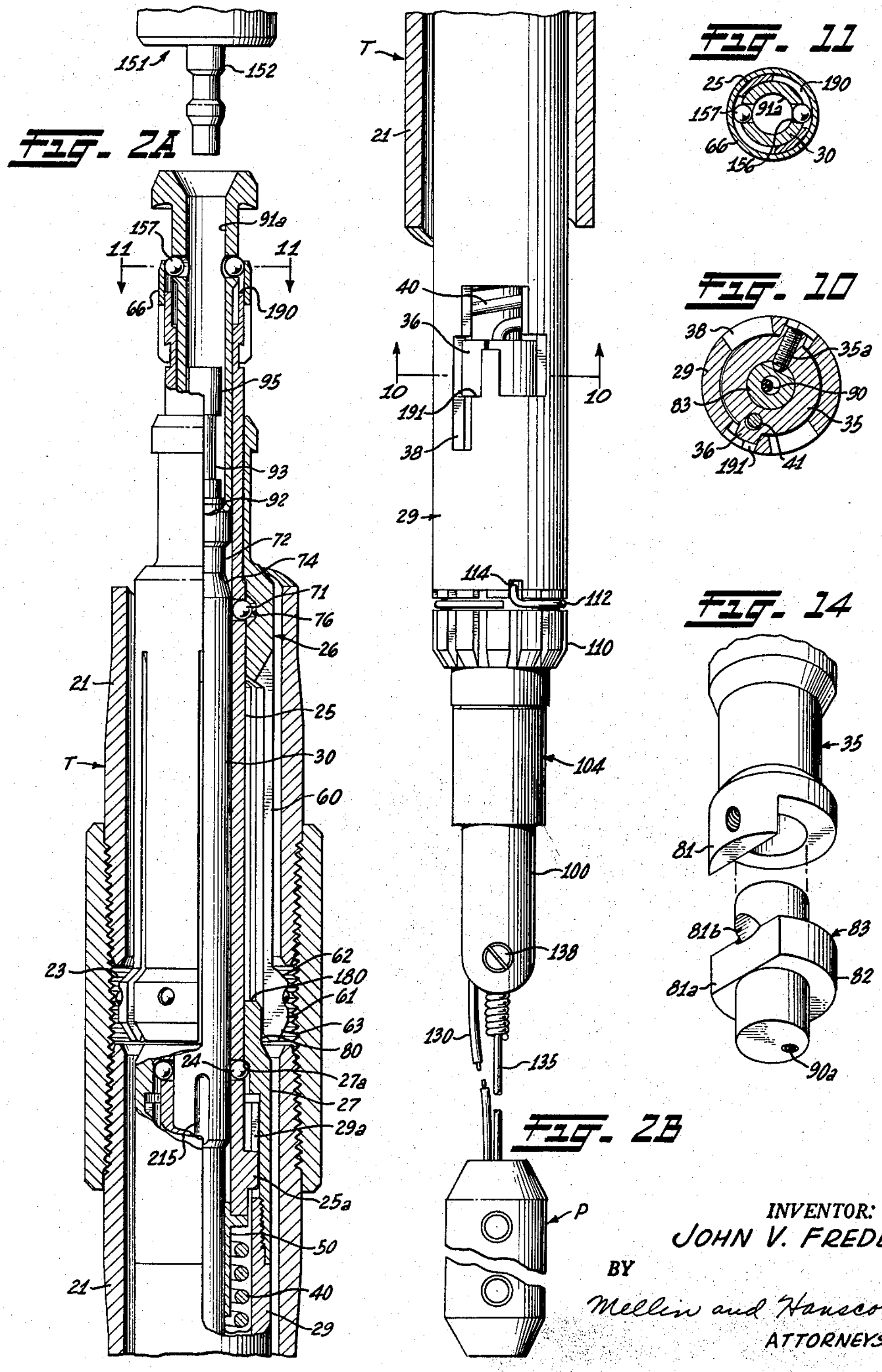
FIGS. 2A and 2B are successive elevational views, similar to FIGS. 1A, 1B and 1C, showing the device illustrated in FIGS. 1A, 1B and 1C locked in a coupling recess of a well tubing string, the running tool having just been freed from the device.
FIG. 10 is a cross-sectional view taken along line 10—10 of FIG. 2A.
FIG. 11 is a cross-sectional view taken along line 11—11 of FIG. 2A.
FIG. 14 is a perspective view showing how the switch rotor and the control member are assembled for non-rotational relative movement.

As shown in FIGS. 1C and 14, the lower portion of control member 35 has been milled away so as to leave a flattened downwardly projecting lug 81 which engages the flat surface **81*a* formed on the external annular flange 82 of switch rotor 83 when they are assembled. They are secured by tightening screw 35*b* in recess 81*b* of the switch rotor. The engagement of these flat surfaces prevents relative rotation between the control member and the switch rotor. Thus, the switch rotor 83 rotates about its longitudinal axis together with the control member 35 as the lugs 36 progress along control slots 38**.

An insulated electrical conductor wire 90 passes through bore 91 of tubular core 30 with its upper end passing through both insulator bushing 92 and resilient sleeve 93, which are disposed in enlarged bore **91*a* of the core, to terminate in an enlarged head or contact 94 which is covered by contact cap 95. The lower end of wire 90 is fastened in offset bore 97 of switch rotor 83 so that the extreme lower end of the wire 90*a* is flush with the lower end face 98** of the rotor and is slightly off center as shown.

Switch housing 100 is provided with an external annular flange 101 having longitudinal slots 102 which are adapted to receive the fingers 103 of collet 104, whose lower tubular portion surrounds switch housing 100. The upper ends of collet fingers 103 have inwardly projecting bosses 106 which engage the external annular groove 107 formed in the outer surface of control member 35. The upper ends of collet fingers 103 are confined within body bushing 110 which is threadedly connected to the lower end of tubular body 29. Body bushing 110 is provided with an annular groove 111 in which lock ring 112 is disposed. One end of the lock ring is bent upwardly as at 113 so that the bent end portion is engageable in any one of a plurality of external longitudinal slots 110*a* formed in the outer surface of the bushing. The upper end of this bent portion of the lock ring projects upwardly sufficiently far to engage downwardly opening notch 114 formed in the lower end of tubular body 29 as shown in FIG. 2B to prevent unscrewing of body bushing 110. Thus the switch housing 100 is secured to the control member 35.

Figure 15:
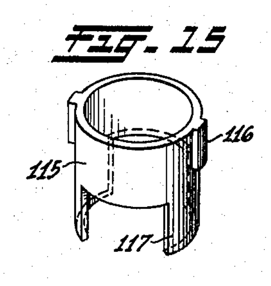
FIG. 15 is a perspective view of the switch key.

Switch key 115 (which may be better seen in FIG. 15) is disposed about control member 35 with its outwardly projecting key portions 116 engaging the internal longitudinal key ways 37 formed in the tubular body 29. The downwardly projecting fingers 117 of the switch key are positioned between collet fingers 103 as shown in FIG. 8, thus preventing relative rotation between body 29 and switch housing 100.

Switch housing 100 is provided with an eccentric bore 120 which is enlarged at 121 to accept tubular sealing sleeve 122 as shown. An insulator 123 is disposed within the enlarged upper bore 124 of the sealing sleeve. The insulator is provided with a longitudinal bore, which is aligned with the bore of the sealing sleeve, and which is enlarged at 125 to receive contact 126, and spring 127, which biases the contact upwardly at all times.

The hanger device may be easily parted at the switch mechanism by disengaging end portion 113 of lock ring 112 from notch 114 of body 29 and unscrewing body bushing 110, after which collet fingers 103 are disengaged from control member 35, causing the tool to part at the separation between switch rotor 83 and insulator 123. This not only permits easy handling but also provides additional safety by permitting the making and breaking of this connection while the perforator hanger is just at the surface of the well and the gun perforator is suspended down inside the well at a depth generally well below the surface.

Contact 126 has a downwardly extending reduced diameter portion which passes through the bore of insulator 123 and projects into the bore of the sealing sleeve where it is connected to insulated electrical conductor wire 130 at 131.

Wire 130 extends from contact 126 down to the gun perforator P, a distance sufficient to suspend the gun perforator at the desired level as determined from the collar log, which distance might vary from a few inches to many feet.

The gun perforator is supported by a high tensile wire 135 which is anchored in slot 136, formed in the lower end of switch housing 100, by being secured around pin assembly 137 as shown in FIG. 7. Pin assembly 137 is made up of pin 138 and screw 139 which are threadedly connected to one another so that the internal flange 140 formed in bore 141 of switch body 100 is confined between the head of screw 139 and the end face 142 of pin 138.

Thus, when switch rotor 83 rotates sufficiently relative to switch housing 100, the lower end 90*a* of wire 90 will engage contact 126 to establish electrical continuity from contact 94 at the upper end of wire 90 to the gun perforator at the lower end of wire 130.

The perforator hanger 20 is lowered into the well tubing on a conventional wire line W and string of wire line tools S which may include a battery case 150 and a running tool 151.

Figure 3A:
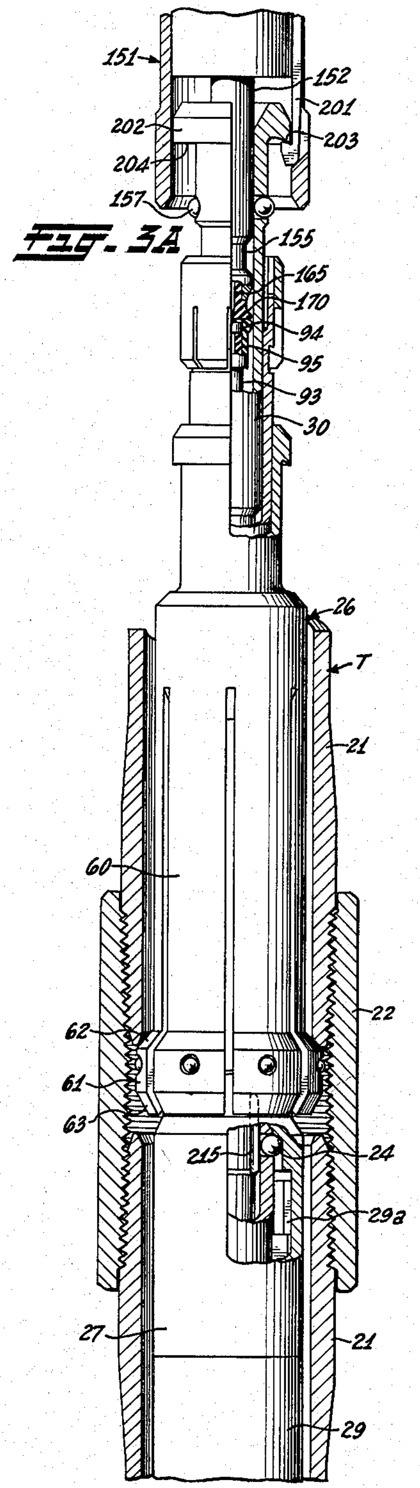
FIGS. 3A and 3B are successive elevational views, similar to FIGS. 1A, 1B and 1C, showing the position of the elements of the device at the time of firing.

Running tool 151 is similar to that disclosed in U.S. Patent 2,605,131 to Marshall et al., dated July 29, 1952. It is provided with a hollow prong 152 which projects downwardly from the core 153 and which is inserted in the upper enlarged portion 91*a* of bore 91 of tubular core 30 so that its external annular groove 155 is aligned with lateral apertures 156 formed in the wall of tubular core 30. Balls 157 which occupy lateral apertures 156 are considerably larger in diameter than the thickness of the wall of the tubular core at the apertures and are movable between an inner position wherein they project inwardly of bore 91*a* as above in FIG. 1A and an outer position wherein they do not project inwardly of bore 91*a*, as shown in FIGS. 2A and 3A.

As is shown in FIG. 1A, balls 157 are engaged in external annular groove 155 of prong 152 and are confined in their inner position by enlarged bore 160 formed in the upper end of mandrel 25. Thus, running tool 151 is securely fastened to perforator hanger 20.

The battery case 150 is provided with at least one cell 161, herein called a battery, insulated therefrom by tubular insulator 162 while one pole is grounded at 150*a*. The other pole 163 is electrically connected to conductor needle 165 by wire 166, fuse 167, and wire 168. Thus, electrical energy is furnished the conductor needle 165 by battery 161, and when conductor needle 165 is in engagement with contact 94, electrical energy will be available a the lower end 90*a* of wire 90 disposed in tubular core 30. As yet, however, conductor needle 165 cannot move downwardly to engage contact 94 since balls 157 prevent prong 152 from moving downwardly relative to tubular core 30. Further, conductor needle 165 is insulated by needle cap 170, while as before explained, contact 94 is insulated by contact cap 95 and resilient sleeve 93.

*Operation*

In general, the above described apparatus is designed to be operated from the top of the well by six wire line manipulations, namely (1) a lowering of the entire apparatus in to the well, (2) a pulling up on the wire line to anchor the apparatus and release the running tool, (3) a lowering to reconnect the running tool and to connect the battery to the detonating circuit, (4) a pulling up on the wire line to fire the perforator, (5) a release in wire line tension to unanchor the apparatus, and (6) a pulling up on the wire line to remove the apparatus from the well. These steps will now be briefly described, with a more complete description following thereafter.

In step 1, the entire apparatus, comprising the running tool, perforator hanger and detonator are lowered into the well until they are below a preselected coupling recess 23. This recess is determined from the normal collar log of the well.

In step 2, the running tool 151, secured by locking balls 157 to core 30, is pulled up by the wire line to move the perforator hanger upwardly. Collet fingers 61 spring out into recess 23 and core 30 is pulled upwardly relative to the collet 26 so that locks 80 locks the collet fingers out. The outwardly biased collet fingers 61 on collet 26 and the lock surface 80 on lock member 27 together cooperate to function as a locking means mounted on mandrel 25 for locking the perforator hanger against vertical movement in the tubing string by upward movement of the mandrel in the tubing string. The locking balls 71 enter recess 76, thus freeing the core 30 for upward movement relative to tubular mandrel 25. Core 30 moves upwardly, compressing spring 40. Lug 36 moves from position 192 to 193, and spring 40 rotates the lug 36 to position 194. The locking balls 157 now move into slots 190 and completely free the running tool 151 from core 30.

Step 3 comprises lowering the wire line. The running tool dogs 201 engage the fishing neck 204 of the inner core to reconnect the running tool and perforator hanger. The needle 165 engages contact 94 to connect the battery 161 to the perforator hanger.

The wire line is again pulled up in step 4. The core 30 is again pulled up against spring 40, and the lug 36 moves upwardly to position 195 and rotationally to position 196. During rotation, the switch rotor 83 rotates and completes the circuit from the battery to the perforator. The perforator fires and fuse 167 melts.

In step 5, tension on the wire line is relaxed, allowing core 30 to move downwardly. Gravity and spring 40 move the lock 80 downwardly to unlock collet fingers 61 from the tubing recess 23. Lug 36 moves downwardly to position 197 and rotates to position 198. During this rotation the switch rotor 83 rotates to break the circuit to the perforator.

The final step 6 comprises pulling upwardly on the wire line. The perforator hanger is freed in step 5, and all parts are pulled from the well.

Each step will now be discussed in greater detail.

FIGS. 1A, 1B and 1C show the perforator hanger 20, running tool 151, battery case 150, and wire line tool string S as they appear while being lowered through tubing string T on a conventional wire line W in step 1.

During the lowering operation, collet bosses 61 glide along the inner wall of the tubing T, being pressed into intimate contact therewith due to the inherent tendency of the collet fingers to relax or assume their undistorted position shown in FIG. 2A. The drag of collet bosses 61 thus causes collet 26 to assume its upper position wherein its upper end surface 175 abuts the lower ends of fingers 67 of collet 66 as the perforator hanger is lowered through well tubing T.

When the desired depth has been reached, step 2 begins, and the wire line tools are lifted. The perforator hanger moves upwardly, but collet 26 remains motionless temporarily until the extreme upper end surface 180 of lock member 27 contacts the lower end surfaces 181 of fingers 60 of collet 26, after which the collet rides upwardly thereon.

When, during upward travel of the device, the outwardly pressed bosses 61 of collet fingers 60 become aligned with coupling recess 23, they will spring outwardly and engage therein. Collet fingers 60 thus assume their undistorted position and permit the reduced diameter portion 80 of lock member 27 to enter enlarged bore 182 of collet 26 and lock collet fingers 60 against inward displacement from the coupling recess 23. FIG. 2A shows the collet in its locked position.

After lock member 27 enters collet 26, balls 71 become aligned with the internal annular groove 76 formed in collet 26 and will be forced into engagement therewith due to the upward pull of the wire line and tools acting on balls 71 through conical surface 74. As balls 71 clear conical surface 74, continued pull on the wire line results in continued upward movement of tubular core 30 relative to mandrel 25, which upward movement is resisted by the compression of spring 40. It must be remembered that spring 40 is both in compression and torsion, tending to move core 30 down, relative to tubular body 29, and at the same time tending to rotate the core in a clockwise direction, as viewed from the lower end, as explained before.

Figure 17:
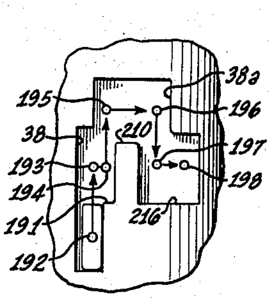
FIG. 17 is a diagrammatical view showing the path of the control lug as it follows the operating slot.

After tubular core 30 has been lifted sufficiently to place balls 157 on a level with slots 190 formed in the upper end of mandrel 25, they will not engage therewith due to the balls and slots being vertically misaligned. However, about the time that the balls reach the level of the slots, lug 36 operating in control slot 38 will clear shoulder 191 (FIG. 17) of slot 38 and will be forced to move to the right, i.e., lug 36 which begins at position 192 will, when position 193 is reached, be forced to position 194. This movement permits a very limited rotational movement between the tubular core 30 and mandrel 25 but is adequate to place balls 157 in vertical alignment with slots 190 so that conical surface 195 which forms the lower limit of groove 155 of prong 152 cams balls 157 outwardly into engagement with slots 190 of mandrel 25, thus clearing groove 155 whereupon running tool prong 152 is unlocked from the perforator hanger and the running tool is lifted free, leaving the perforator hanger securely locked in the coupling recess. This freeing of the running tool signifies that the perforator hanger has been properly locked into place. At this end of step 2, lug 36 is left resting atop shoulder 191 as is clearly shown in FIG. 2B, thus supporting tubular core 30 in a position high enough to maintain balls 157 in alignment with slots 190 formed in the upper end of mandrel 25.

The freed wire line tools can be lifted to the surface at this time if desired, but such is not necessary. In fact, it would be unusual, unless, of course, unusual circmstances prevailed. For instance, at this point it may be desirable to double check the location of the hanger device. In such case the tools are lifted to the surface, the running tool replaced with perhaps a blank tool and the wire line tools lowered into the well again for a measurement. Perforating then is accomplished by lowering the running tool into the well again and engaging the hanger device in a manner to be explained shortly. Or, should it become desirable to withdraw the device without perforating, the batteries may be removed from the battery case before the running tool enters the well the second time.

When it is desired to condition the gun perforator for firing, step 3 is begun. The running tool is lowered until it contacts the perforator hanger, after which the wire line tools are used to deliver a light downward impact to ensure proper engagement of the running tool with the perforator hanger.

As the running tool thus contacts the perforator hanger, prong 152 re-enters the upper portion of bore 91*a* of tubular core 30, needle cap 170 on the lower end of prong 152 is pressed into contact with contact cap 95, while further downward movement of the running tool relative to core 30 results in needle 165 penetrating needle cap 170 and contact cap 95 to establish electrical continuity between the needle 165 and contact 94.

At the same time, the upwardly facing conical surface 200 formed on the upper end of the tubular core 30 cams dogs 201 of running tool 151 outwardly enabling them to pass over the fishing flange 202 of the core, permitting the hooks 203 of dogs 201 to engage the downwardly facing shoulder 204 of fishing flange 202. Thus the running tool takes a firm hold of the upper end of the core so that subsequent lifting of the running tool results in lifting of the core also, electrical continuity between needle 165 and contact 94 being maintained all the while.

To fire the perforator, it is only necessary to lift the tools again and take an upward strain on the wire line (step 4) to lift core 30 a short distance against the compression of spring 40.

When core 30 is lifted, lug 36 moves from position 194 (FIG. 17) to position 195, at which time the lug clears upwardly facing shoulder 210 whereupon the torsional force of spring 40 causes core 30 to rotate relative to body 29 and mandrel 25 as limited by lug 36 as it is stopped in position 196 by contacting wall 38*a*.

Figure 3B:
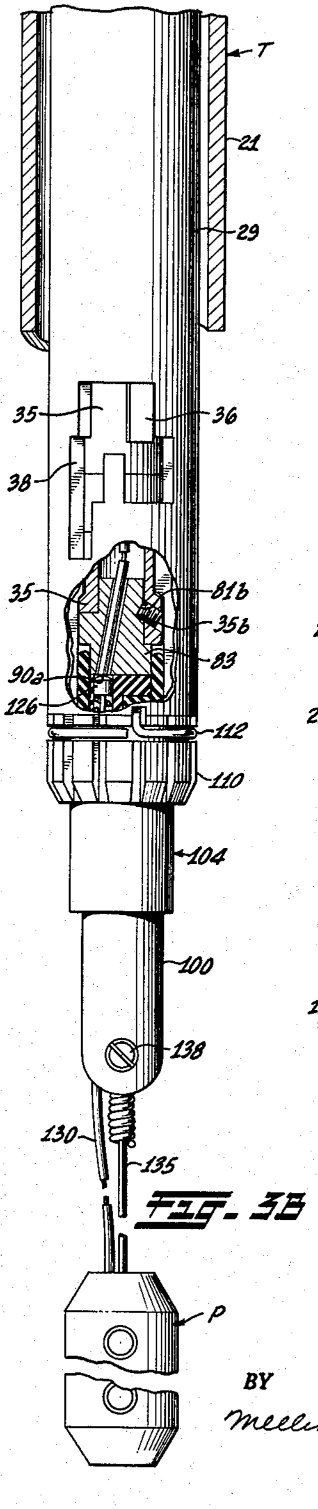
Figure 18:
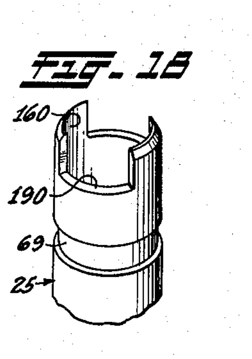
FIG. 18 is a perspective view of the upper end of the tubular mandrel showing the pair of slots formed therein.

During this rotational movement of the core relative to the body, switch rotor 83 is likewise rotated relative to switch housing 100, thus closing the switch to establish electrical continuity between the lower end 90*a* of wire 90 and contact 126 and causing the gun perforator to fire, since electrical current can now flow from the grounded battery 161 through wire 166, fuse 167, wire 168, needle 165, contact 94, wire 90, contact 126 and wire 130 to the perforator which is also grounded. FIGS. 3A and 3B show the device in firing position.

It will be noted that at the time the gun is fired, the perforator hanger is securely locked in the coupling recess and that the wire line and tools are in tension, both of which conditions are highly desirable.

Fuse 167 is of such rating that it will blow immediately as the circuit is completed; however, the very current that causes its fusible strip to melt also causes detonation of the charges in the gun perforator.

After the gun perforator has fired, the tension on the wire line is relaxed (step 5). Lowering of the tools permits lug 36 to move downwardly from position 196 to 197.

When lug 36 reaches position 197, torsion of spring 40 causes it to move rotationally to position 198.

During this rotational movement of the core relative to the body, i.e., during indexing of lug 36 from position 197 to 198, switch rotor 83 is further rotated relative to switch body 100 for the purpose of opening or disrupting the electrical circuit, thus breaking continuity between the battery and the gun perforator so that the perforator may be withdrawn from the well in complete safety. This feature would be of particular importance in case of a misfire.

Also, as lug 36 advances from position 197 to 198, slots 215, formed in the outer surface of core 30, become vertically aligned with balls 24 which may now engage therein, no longer locking the lock member 27 against downward movement upon mandrel 25. Lock member 27 cannot move downwardly at this time, however, since it is supported by lug 36 and the wire line tools.

Further lowering of the wire line tools permits lock member 27, and thus body 29, to move downwardly relative to core 30 and its lug 36. During this movement, downwardly facing shoulder **27*a* of lock member 27 will cam balls 24 inwardly into engagement with groove 215, after which body 29 is free to move downwardly to the position shown in FIG. 4. Should gravity fail to move the body 29 downwardly, then spring 40 will do so by biasing lug 36 against the lower limit 216 of slot 38**.

Figure 4:
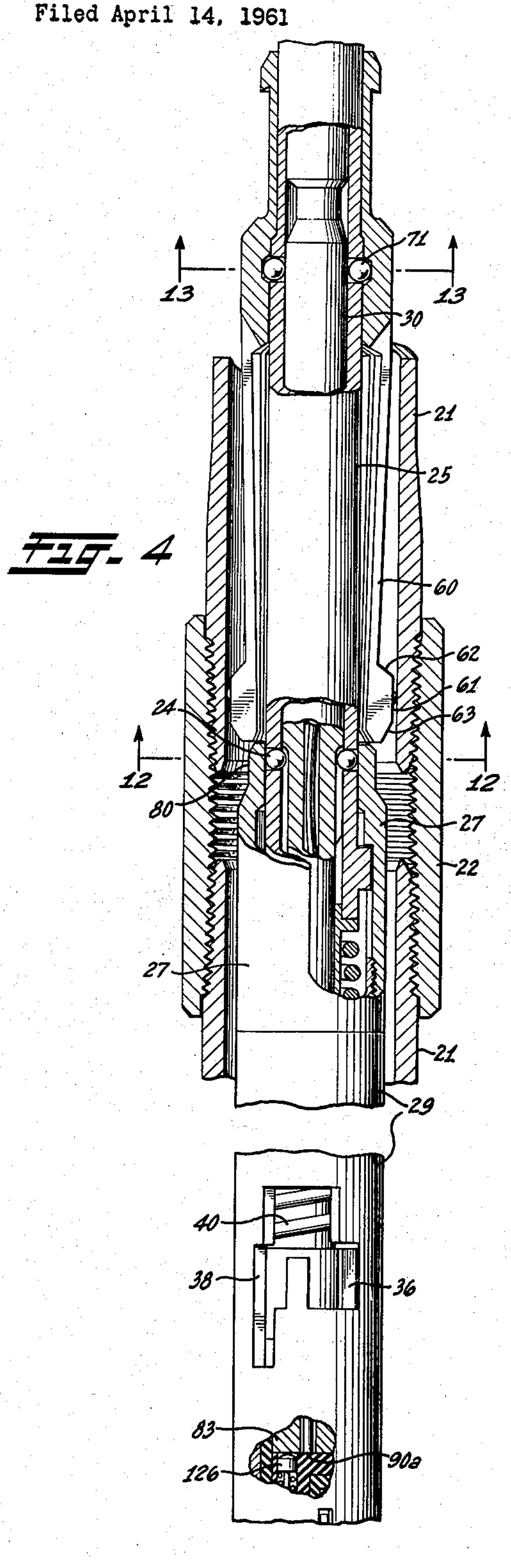
FIG. 4 is a fragmentary view partly in section and partly in elevation with some parts broken away showing the device of FIG. 1 after it has been released from the coupling recess and is being lifted through the well tubing.
Figure 13:
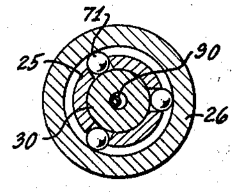
FIG. 13 is a cross-sectional view taken along line 13—13 of FIG. 4.
Figure 12:
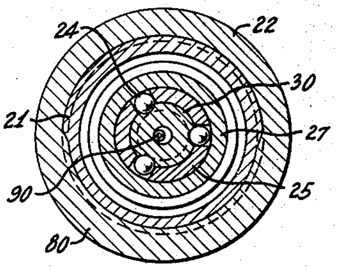
FIG. 12 is a cross-sectional view taken along line 12—12 of FIG. 4.

Downward movement of lock member 27 upon mandrel 25 results in its upper reduced portion 80 being withdrawn from its collet locking position shown in FIG. 2A to its releasing position shown in FIG. 4. This renders the perforator hanger completely unlocked from the coupling recess so that it may be lifted to the surface merely by pulling on the wire line W (step 6).

As the perforator hanger moves upwardly through the tubing, collet fingers 60 will be forced inwardly by cam action of their upward facing shoulder 62 of bosses 61 as they encounter downwardly facing shoulders such as the lower end of joint 21 which forms the upper limit of coupling recess 23.

Thus it has been shown that a perforator hanger has been provided which will fulfill all of the objects previously set forth.

It is understood that the above described device could be adapted to seat in a special landing nipple by providing the collet fingers with outwardly extending bosses having a configuration corresponding to that of the landing nipple in a manner similar to that taught in United States Patent No. 2,948,338 to G. M. Raulins et al.

Additional safety can be provided by countersinking a metal insert 216 in insulator 123 as shown in FIG. 5 so that the lower end **90*a* of wire 90 will be grounded to the lower end of switch rotor 83 when the rotor has indexed to its final position. If, by this time fuse 167** has not blown, it should do so, rendering the device completely safe.

It is to be understood that the apparatus illustrated and described herein is to be taken as a preferred embodiment of the invention and that various changes may be made in the shape, size and arrangement of parts without departing from the spirit of the invention or the scope of the appended claims.

Having thus described my invention, what I claim and desire to secure by Letters Patent is:

1. In a well having a tubing string therein provided with vertically spaced apart tubing joint recesses, apparatus for perforating said well, comprising: a perforator hanger adapted to be vertically disposed in said tubing string for vertical movement therethrough and comprising inner and outer members telescoped together for limited vertical and rotational relative movement; spring means connected to said inner and outer members for biasing said inner member downwardly and rotationally in said outer member; interengaging lug means on one and slot means on the other of said members for permitting first and second consecutive limited relative rotative movements of said members by said spring means in response, respectively, to consecutive first upwardly and second downwardly movements of said inner member relative to said outer member; locking means mounted on said outer member for locking said perforator hanger against vertical movement in said tubing string by upward movement of said outer member in said tubing string; means forming an electrical circuit through said inner member; switch means in said electrical circuit for closing said circuit in response to one of said first relative movements of said members and for opening said circuit in response to one of said second relative movements of said members, said switch means having a first switch part connected to said outer member for movement therewith and a second switch part connected to said inner member for movement therewith; means operable in response to one of said second relative movements of said members for unlocking said locking means whereby said perforator hanger may be pulled from the well; a running tool adapted to be connected to a wire line; interengaging means on and for connecting said running tool and said inner member; an electrical battery mounted for movement with said running tool, said battery being electrically connected to said electrical circuit; an electrically operated gun perforator suspended from said perforator hanger; and means electrically connecting said gun perforator to said electrical circuit, said switch means being disposed in said circuit between said battery and gun perforator.

2. Apparatus for use in perforating wells, comprising: a perforator hanger adapted to be vertically disposed and comprising inner and outer members telescoped together for limited vertical and rotational relative movement; spring means connected to said inner and outer members for biasing said inner member downwardly and rotationally in said outer member; interengaging lug means on one and slot means on the other of said members for permitting first, second and third consecutive limited relative rotative movements of said members by said spring means in response, respectively, to consecutive first upwardly, second upwardly and third downwardly movements of said inner member relative to said outer member; means forming an electrical circuit through said inner member; switch means in said electrical circuit for closing said circuit in response to one of said second relative movements of said members and for opening said circuit in response to one of said third relative movements of said members said switch means having a first switch part connected to said outer member for movement therewith and a second switch part connected to said inner member for movement therewith; a running tool adapted to be connected to a wire line; interengaging means on and for initially detachably connecting said running tool and said inner member; means responsive to one of said first relative movements of said member for releasing said running tool from said inner member; interengaging means on and for reconnecting said running tool and said inner member in response to downward movement of said running tool onto said inner member; an electrical battery mounted for movement with said running tool; means for electrically connecting said battery to said electrical circuit upon reconnection of said running tool and said inner member; an electrically operated gun perforator suspended from said perforator hanger; and means electrically connecting said gun perforator to said electrical circuit, said switch means being disposed in said circuit between said battery and gun perforator.

3. In a well having a tubing string therein provided with vertically spaced apart tubing joint recesses, apparatus for perforating said well, comprising: a perforator hanger adapted to be vertically disposed in said tubing string for vertical movement therethrough and comprising inner and outer members telescoped together for limited vertical and rotational movement; spring means connected to said inner and outer members for biasing said inner member downwardly and rotationally in said outer member; interengaging lug means on one and slot means on the other of said members for permitting first, second and third consecutive limited relative rotative movements in the same direction of said members by said spring means in response, respectively, to consecutive first upwardly, second upwardly and third downwardly movements of said inner member relative to said outer member; locking means mounted on said outer member for locking said perforator hanger in one of said tubing joint recesses and against vertical movement in said tubing string by upward movement of said outer member in said tubing string; means forming an electrical circuit through said inner member; switch means in said electrical circuit for closing said circuit in response to one of said second relative movements of said members and for opening said circuit in response to one of said third relative movements of said members said switch means having a first switch part connected to said outer member for movement therewith and a second switch part connected to said inner member for movement therewith; means operable in response to one of said third relative movements of said members for unlocking said locking means whereby said perforator hanger may be pulled from the well; a running tool adapted to be connected to a wire line; interengaging means on and for initially detachably connecting said running tool and said inner member; means responsive to one of said first relative movements of said members for releasing said running tool from said inner member; interengaging means on and for reconnecting said running tool and said inner member in response to downward movement of said running tool; an electrical battery mounted for movement with said running tool; means for electrically connecting said battery to said electrical circuit upon reconnection of said running tool and said inner member; an electrically operated gun perforator suspended from said perforator hanger; and means electrically connecting said gun perforator to said electrical circuit, said switch means being disposed in said circuit between said battery and gun perforator.

4. Apparatus as set forth in claim 3 and further comprising: a fuse connected in said electrical circuit, said fuse having a current rating such that it will fail upon the conduction of a current therethrough of a magnitude sufficient to fire said gun perforator.

5. Apparatus as set forth in claim 3 and further comprising: means to ground said electrical circuit to said perforator hanger in response to one of said third relative movements of said members.

6. Apparatus as set forth in claim 3 and further comprising: a fuse connected in said electrical circuit, said fuse having a current rating such that it will fail upon the conduction of a current therethrough of a magnitude sufficient to fire said gun perforator; and means to ground said electrical circuit to said perforator hanger in response to one of said third relative movements of said members.

7. In a well having tubing set therein, the method of perforating the well without removal of such tubing from the well, comprising: lowering on a wire line through such tubing an electric current supply means and a perforator hanger from which a perforating gun is suspended a substantial distance therebelow; anchoring said perforator hanger in said tubing such that the gun suspended from said perforator hanger is located adjacent the area of the well to be perforated; next pulling upwardly on and releasing downwardly said wire line; connecting said electric current supply means to an electrical circuit leading to the perforating gun in response to the last-mentioned step of pulling upwardly on and releasing downwardly said wire line; pulling upwardly on said wire line; completing the electric circuit and firing the perforating gun in response to the last-mentioned step of pulling upwardly on said wire line; and then by means of said wire line unanchoring and removing said perforator hanger from said tubing along with such apparatus as remains suspended therefrom.

8. In a well having tubing set therein, the method of perforating the well without removal of such tubing from the well, comprising: lowering on a wire line through such tubing an electric current supply means and a perforator hanger from which a perforating gun is suspended a substantial distance therebelow; pulling up on said wire line; anchoring said perforator hanger in said tubing such that the gun suspended from said perforator hanger is located adjacent the area of the well to be perforated in response to the last-mentioned step of pulling up on said wire line; pulling upwardly on and releasing downwardly said wire line; connecting said electric current supply means to an electrical circuit leading to the perforating gun in response to the last-mentioned step of pulling upwardly and releasing downwardly said wire line; pulling upwardly in said wire line; completing the electric circuit and firing the perforating gun in response to the last-mentioned step of pulling upwardly on said wire line; releasing the tension on the wire line; unanchoring said perforator hanger in response to the last-mentioned step of releasing the tension on said wire line; and then by means of said wire line removing said perforator hanger from said tubing along with such apparatus as remains suspended therefrom.

9. In a well having tubing set therein, the method of perforating the well without removal of such tubing from the well, comprising: lowering on a wire line through such tubing an electric current supply means and a perforator hanger from which a perforating gun is suspended a substantial distance therebelow; pulling up on said wire line; anchoring said perforator hanger in said tubing and releasing said wire line from said perforator hanger in response to the last-mentioned step; pulling upwardly on and releasing downwardly said wire line; reconnecting said wire line to said perforator hanger and connecting said electric current supply means to an electrical circuit leading to the perforating gun in response to the last-mentioned step; pulling upwardly on said wire line; completing the electric circuit and firing the perforating gun in response to the last-mentioned step; releasing the tension on the wire line; unanchoring said perforator hanger in response to the last-mentioned step; and then by means of said wire line removing said perforator hanger from said tubing along with such apparatus as remains suspended therefrom.

References Cited by the Examiner

UNITED STATES PATENTS

| | | | |
|---|---|---|---|
| 1,875,583 | 9/32 | Fox | 102—21 |
| 2,846,948 | 8/58 | Lebourg | 102—21 |
| 2,876,843 | 3/59 | Huber | 166—55 |
| 2,891,620 | 6/59 | Bielstein | 166—35 |
| 2,986,214 | 5/61 | Wiseman et al. | 166—55 |
| 3,003,556 | 10/61 | McGehee | 166—35 |
| 3,100,533 | 8/63 | Fredd | 166—125 |

BENJAMIN HERSH, *Primary Examiner.*

BENJAMIN BENDETT, *Examiner.*